United States Patent
Katayama

(10) Patent No.: US 7,413,267 B2
(45) Date of Patent: Aug. 19, 2008

(54) DRIVER MODEL AND ASSISTANCE FUNCTION EVALUATION APPARATUS AND METHOD FOR VEHICLE DYNAMICS CONTROL SYSTEM IN WHICH DRIVER MODEL IS EQUIPPED

(75) Inventor: Takeshi Katayama, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 164 days.

(21) Appl. No.: 11/124,135

(22) Filed: May 9, 2005

(65) Prior Publication Data

US 2005/0275284 A1 Dec. 15, 2005

(30) Foreign Application Priority Data

May 27, 2004 (JP) .............................. 2004-158214

(51) Int. Cl.
  *B60T 8/66* (2006.01)
(52) U.S. Cl. .......................................... 303/165; 701/70
(58) Field of Classification Search ................. 303/165; 701/70, 71, 77
  See application file for complete search history.

(56) References Cited

U.S. PATENT DOCUMENTS

| | | | |
|---|---|---|---|
| 5,668,724 A | | 9/1997 | Ehret et al. |
| 5,765,116 A | * | 6/1998 | Wilson-Jones et al. ........ 701/41 |
| 5,809,444 A | | 9/1998 | Hadeler et al. |
| 6,212,453 B1 | * | 4/2001 | Kawagoe et al. .............. 701/41 |
| 6,256,561 B1 | * | 7/2001 | Asanuma ..................... 701/41 |
| 6,502,014 B1 | | 12/2002 | Herrmann et al. |
| 2002/0041229 A1 | * | 4/2002 | Satoh et al. .................. 340/438 |

FOREIGN PATENT DOCUMENTS

| | | |
|---|---|---|
| DE | 40 30 704 A1 | 4/1992 |
| DE | 44 46 582 A1 | 6/1996 |
| DE | 199 19 180 A1 | 11/2000 |
| JP | 2000180305 A * | 6/2000 |
| JP | 2002-260143 A | 9/2002 |

OTHER PUBLICATIONS

Takehiko Fujioka et al., "Analysis of Driving Behavior of Expert Driver in Double Lane Change by Optimization", Automotive Engineering Society Autumn Meeting Preprints No. 77-03; 2003.
U.S. Appl. No. 11/137,789, filed May 26, 2005, Satou et al.

* cited by examiner

*Primary Examiner*—Pam Rodriguez
(74) *Attorney, Agent, or Firm*—Foley & Lardner LLP

(57) ABSTRACT

In assistance function evaluation apparatus and method for a vehicle dynamics control system, the vehicle dynamics control system being an object to be evaluated, a simulator is provided to obtain a data base when the vehicle dynamics control system is operated, a vehicle model, a road surface environment model, and a driver model that calculates a steering angle imposed on the vehicle model to trace a target course are provided, the simulator comprises a driver intention quantity detecting section that detects an intention quantity of a vehicle driver to move the vehicle in a lateral direction and a system function detecting section that detects a function quantity of the vehicle dynamics control system and evaluates that the assistance function of the vehicle dynamics control system is in conformity to the driver when the system function quantity and the driver intention quantity are balanced without excess or deficiency.

16 Claims, 13 Drawing Sheets

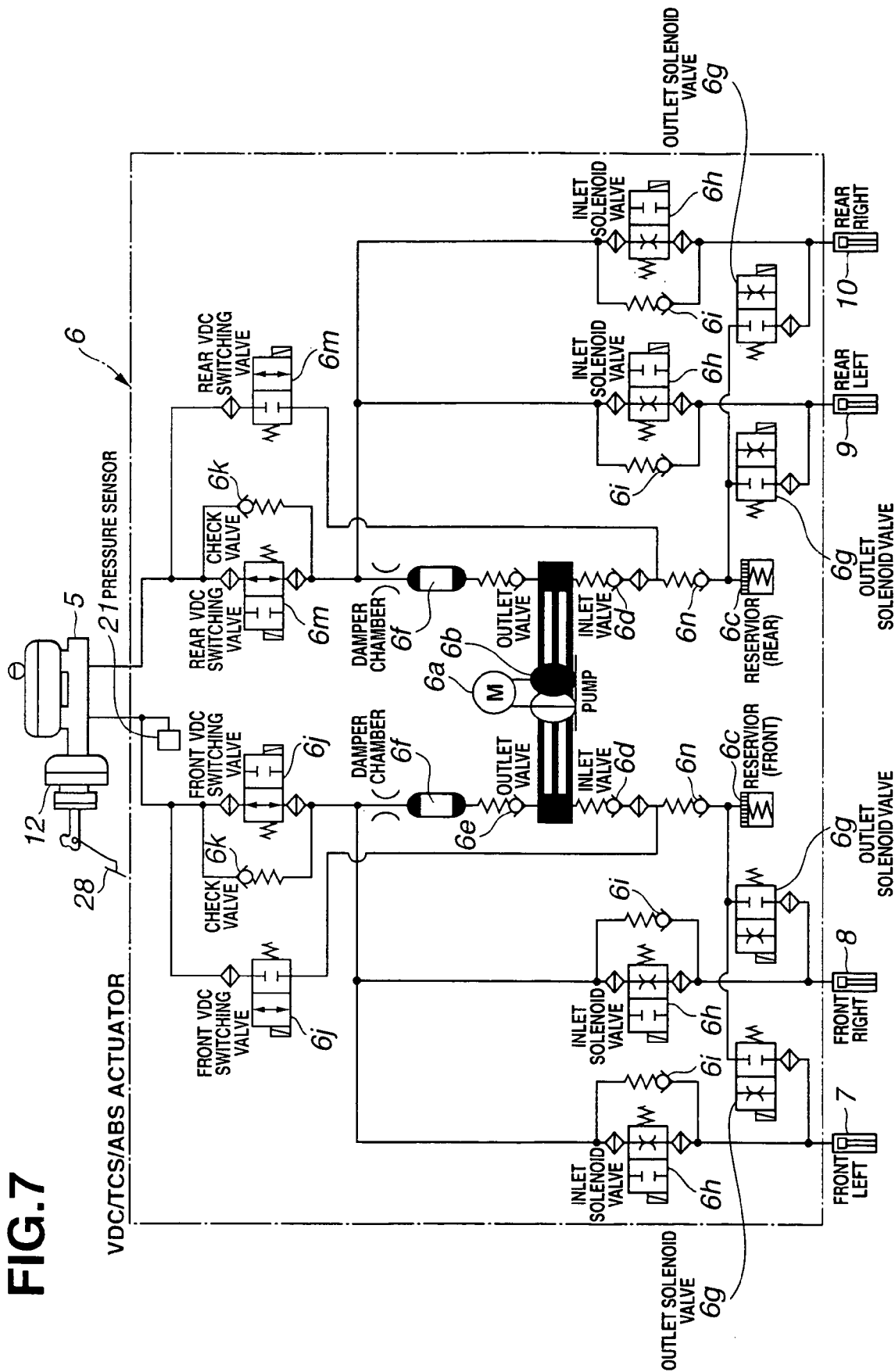

DRIVER MODEL AND ASSISTANCE FUNCTION EVALUATION APPARATUS AND METHOD FOR VEHICLE DYNAMICS CONTROL SYSTEM IN WHICH DRIVER MODEL IS EQUIPPED

BACKGROUND OF THE INVENTION

1. Field of the Invention

The present invention relates to a driver model used to reproduce a travel along a set target course (for example, an obstacle avoidance course by a lane change and a turning) through a simulation and assistance function evaluation apparatus and method for a vehicle dynamics control system in which the driver model is equipped.

2. Description of the Related Art

In recent years, vehicle control systems have become highly functionalized and highly complicated at an acceleration pace from advances of electronics and from social security and environment demands. In addition, a shortening of a development interval of time to put commercial products into a market at an appropriate timing is a problem to be solved. As means having a possibility of solving these problems, attention has been paid to control system development utilizing a control system CAE (Computer Aided Engineering) tool. Control system development techniques utilizing the control system CAE tool include: SILS (Software In the Loop) in which an object to be controlled and a control unit are modeled; and HILS (Hardware In the Loop Simulation) in which the object to be controlled is modeled and the control unit as an actual object is used. In a case where a control system is developed using such a technique as described above, it is very effective when such a usage that predetermined signals are inputted to ECU (Electronic Control Unit) is carried out. Many markers and control system suppliers already utilize such a technique as described above. However, in the development of the control system (especially a travel (running) control system), inputs of a steering wheel, an accelerator, and a brake are carried out by a vehicle driver (viz., a human being). Hence, in a case where a function guarantee of the control system is carried out, it becomes necessary to provide the inputs, with the driver intention and action taken into consideration, for the control system and to take a balance between the driver intention and action and an operation of the control system. A Japanese Patent Application First Publication No. 2002-260143 published on Sep. 13, 2002 exemplifies a previously proposed AHS (Automated Highway System) evaluation apparatus in which a driver model is equipped as an apparatus for supporting a development of the control system with the driver intention and action taken into consideration. In addition, although in a research phase, a vehicle drive motion analysis of a skilled driver is carried out to aim at an application of this analysis to a travel-system (running-system) control system (for example, refer to 2003 Automotive Engineering Society Autumn Meeting Preprints No. 77-03, in 2003).

SUMMARY OF THE INVENTION

However, in the previously proposed evaluation apparatuses described above, it is impossible to evaluate the control system function (viz., to confirm whether there is a marketability and whether the control system is accepted by users) although it is possible to verify a consistency to a designed specification even using the tool (viz., to confirm whether the control system is made in conformity to the designed specification).

It is, therefore, an object of the present invention to provide a driver model which can handle a steering operation by the driver as a feedback control operation for a vehicle position predicted at a forward gaze point and a vehicle motion and which can reproduce with good accuracy a running situation in which the vehicle motion is varied in a vehicle model and to provide assistance function evaluation apparatus and method for a vehicle dynamics control system which can evaluate with good accuracy whether an assistance function of the vehicle dynamics control system is in conformity to the driver.

According to one aspect of the present invention, there is provided a driver model used to reproduce a travel along a set target course through a simulation, comprising: a calculating section that detects a deviation between a vehicular lateral displacement which would be developed in a case where the vehicle is advanced to a forward gaze point with a present vehicle posture maintained, the forward gaze point being a point of place separated from the vehicle by a predetermined forward gaze distance when the vehicle is present on the target course and a deviation of a yaw angle displacement and a target yaw angle and calculates a steering angle imposed on a vehicle model through a feedback control using a positional deviation quantity and a positional deviation gain and a yaw angle deviation quantity and a yaw angle deviation gain.

According to another aspect of the present invention, there is provided an assistance function evaluation apparatus for a vehicle dynamics control system, the vehicle dynamics control system being an object to be evaluated and the assistance function evaluation apparatus comprising: models modeled for vehicle elements other than the vehicle dynamics control system; and a simulator configured to obtain a data base when the vehicle dynamics control system is operated, the models comprising: a vehicle model that is architected with parts characteristics of a vehicle which is an object to be evaluated parameterized; a road surface environment model that prescribes a target course; and a driver model that calculates a steering angle imposed on the vehicle model to trace the target course and the simulator comprising: a driver intention quantity detecting section that detects an intention quantity of a vehicle driver to move the vehicle in a lateral direction; and a system function detecting section that detects a function quantity of the vehicle dynamics control system, and evaluating that the assistance function of the vehicle dynamics control system is in conformity to the driver when the system function quantity and the driver intention quantity are balanced without excess or deficiency.

According to a still another aspect of the present invention, there is provided an assistance function evaluation method for a vehicle dynamics control system, the vehicle dynamics control system being an object to be evaluated and the assistance function evaluation method comprising: providing models modeled for vehicle elements other than the vehicle dynamics control system; and providing a simulator configured to obtain a data base when the vehicle dynamics control system is operated, the models comprising: a vehicle model that is architected with parts characteristics of a vehicle which is an object to be evaluated parameterized; a road surface environment model that prescribes a target course; and a driver model that calculates a steering angle imposed on the vehicle model to trace the target course and the simulator comprising: detecting an intention quantity of a vehicle driver to move the vehicle in a lateral direction; and detecting a function quantity of the vehicle dynamics control system, and evaluating that the assistance function of the vehicle dynamics control system is in conformity to the driver when the system function quantity and the driver intention quantity are balanced without excess or deficiency.

This summary of the invention does not necessarily describe all necessary features so that the invention may also be a sub-combination of these described features.

BRIEF DESCRIPTION OF THE DRAWINGS

FIG. 7 is a schematic diagram representing a brake liquid pressure system of the vehicle dynamics control system mounted in the actual vehicle.

DETAILED DESCRIPTION OF THE PREFERRED EMBODIMENTS

Reference will hereinafter be made to the drawings in order to facilitate a better understanding of the present invention.

First Embodiment

Figure 1:
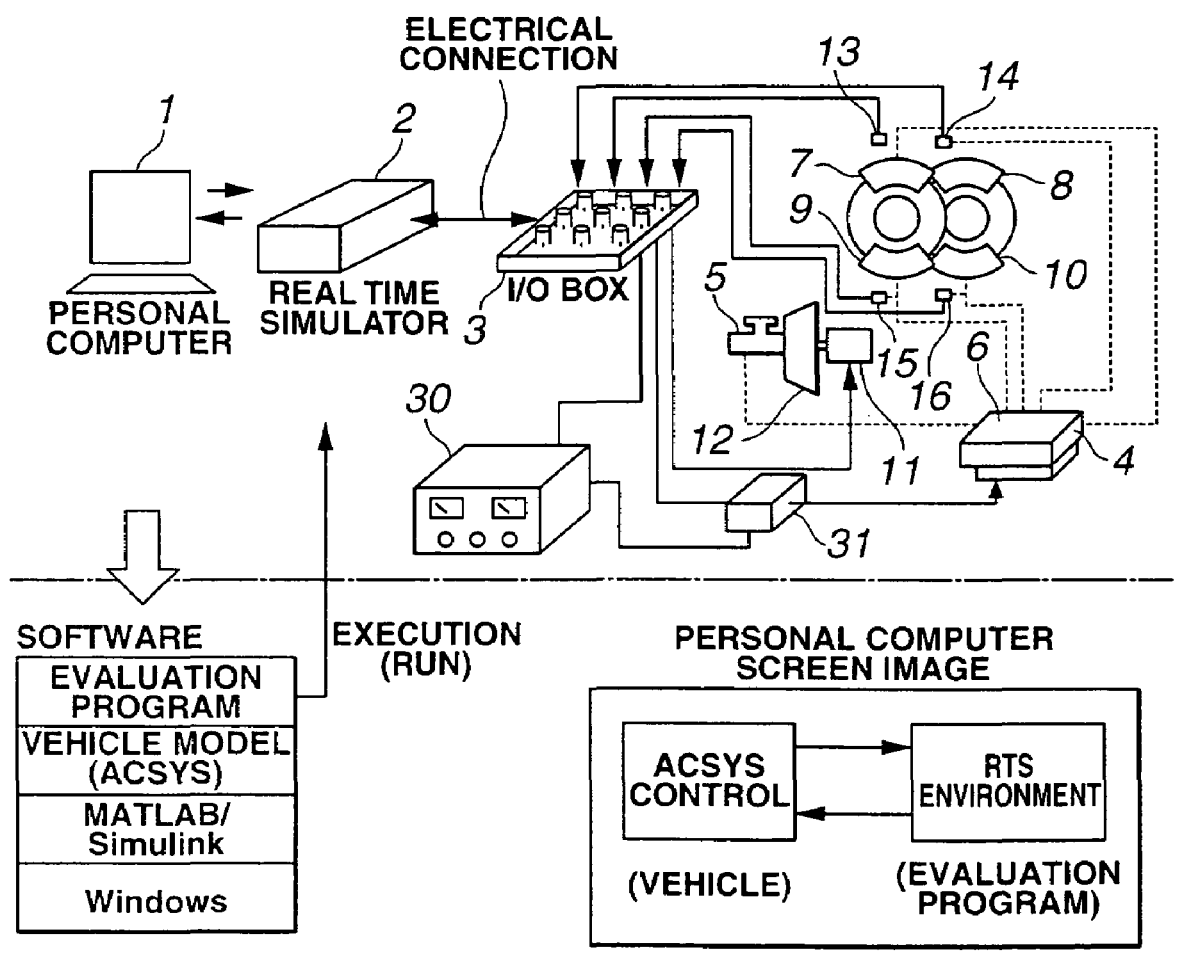
FIG. 1 is a whole system configuration view of an assistance function evaluation apparatus of a vehicle dynamics control system in a first preferred embodiment according to the present invention.
Figure 2:
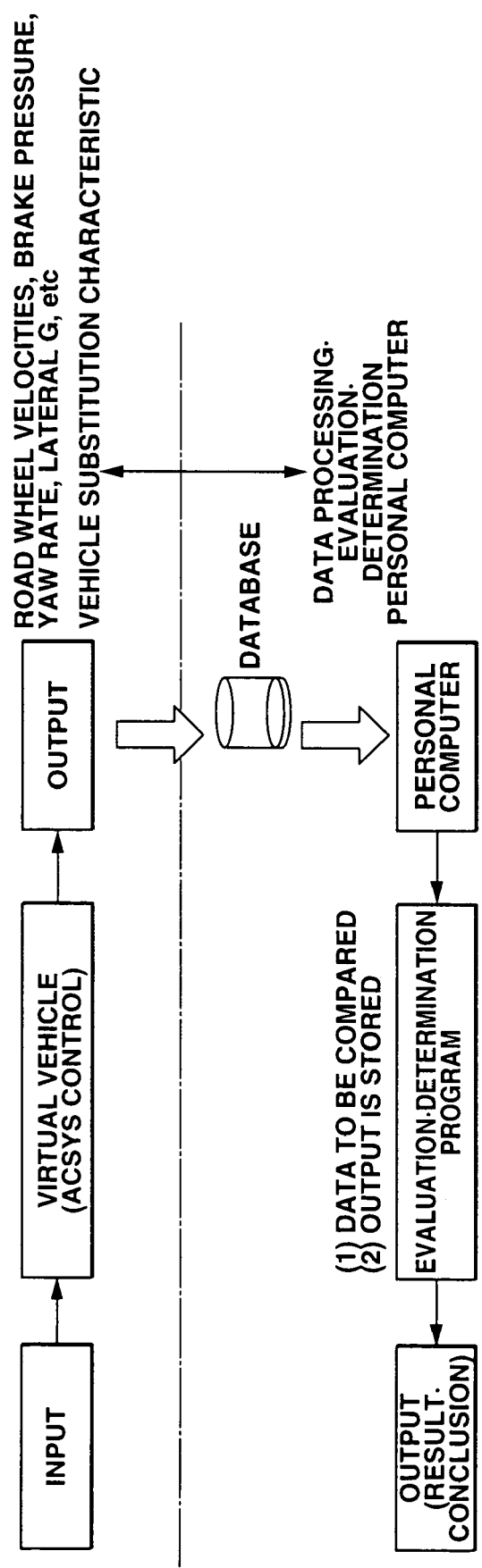
FIG. 2 is a schematic view representing a processing flow in the assistance function evaluation apparatus for the vehicle dynamics control system in the first preferred embodiment shown in FIG. 1.

FIG. 1 shows a configuration view representing hardware and software structure of an assistance function evaluation apparatus for a vehicle dynamics control system in a first preferred embodiment according to the present invention. FIG. 2 shows a rough flow diagram representing an evaluation process executed in the assistance function evaluation apparatus for the vehicle dynamics control system in the first embodiment shown in FIG. 1. In the first embodiment, a real thing of a VDC system (one example of the vehicle dynamics control system which is an object to be evaluated) which is already mounted in a vehicle is used, vehicle elements (components) other than the VDC system are modeled (for example, a virtual vehicle model VM for the vehicle which is an object to be evaluated and a road surface environment model RM), an execution of a Real Time Simulation (RTS) with the vehicle which is the object to be evaluated as a vehicle to be developed intends a development support of the VDC system which meets a user demand, and a function evaluation of the VDC system (a conformity evaluation between a function quantity during an operation of the VDC system and an intention quantity of a driver) is carried out.

It is noted that VDC used in the specification is an abbreviation for Vehicle Dynamics Control, TCS used herein is an abbreviation for Traction Control System, and ABS used herein is an abbreviation for Anti-lock Brake System.

The assistance function evaluation apparatus for the vehicle dynamics control system in the first embodiment includes, as shown in FIG. 1, a personal computer 1, a real time simulator 2 (simulator), an Input/Output (Port) box 3, VDC/TCS/ABS control unit 4, a master cylinder 5, VDC/TCS/ABS actuator 6, a first wheel cylinder 7, a second wheel cylinder 8, a third wheel cylinder 9, a fourth wheel cylinder 10, a brake depression force generator 11, a booster 12, a first wheel cylinder pressure sensor 13, a second wheel cylinder pressure sensor 14, a third wheel cylinder pressure sensor 15, a fourth wheel cylinder pressure sensor 16, a power supply 30, and a relay box 31.

In personal computer 1, as the software, an evaluation program, virtual vehicle model VM(ACSYS), a MATLAB/simulink (trade mark), a windows (trade mark), and so forth are set.

Figure 3:
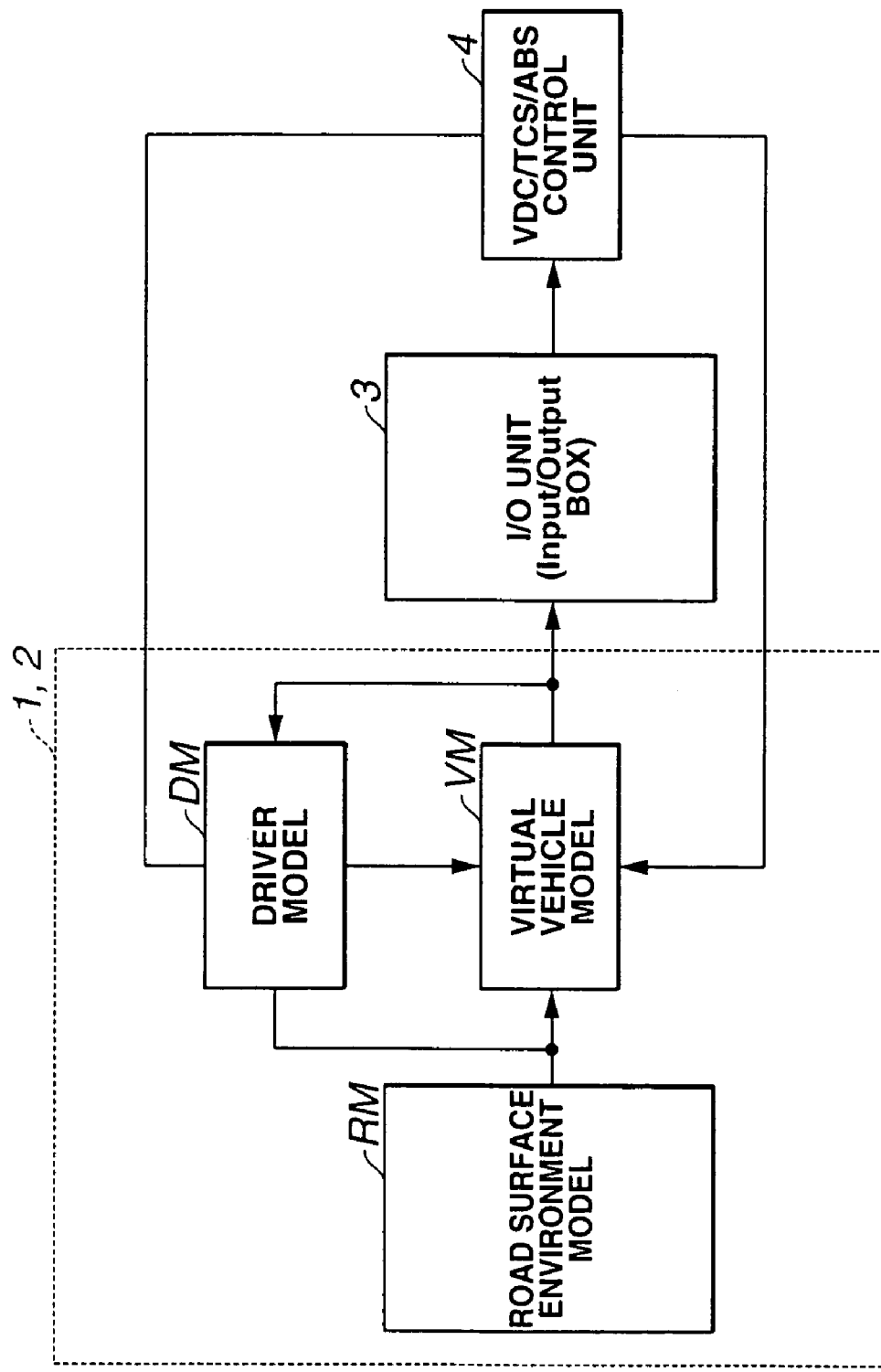
FIG. 3 is a block diagram representing a virtual vehicle model, a road surface environment model, and a driver model used in a real time simulation in the assistance function evaluation apparatus for the vehicle dynamics control system shown in FIG. 1.

The evaluation program includes a steering increment quantity calculating section that calculates a steering increment quantity (a driver intention quantity of a lateral directional movement) and an assistance rate calculating section that calculates an assistance rate (a function quantity of the VDC system) and is a program that evaluates that an assistance function of the VDC system is in conformity to the driver in a case where the assistance rate is balanced with the steering increment quantity without excess or deficiency. In other words, the evaluation program is a program in which, as a simulation model, as shown in FIG. 3, the virtual vehicle model VM, a road surface environment model RM, and a driver model DM are set. Then, as shown in FIG. 2, this program executes a real time simulation, a data base being accumulated, and, when the data base is accumulated by a required quantity, evaluation and determination of the assistance function of the VDC system using a first assistance function evaluation map which is an evaluation data are carried out by this program.

The virtual vehicle model is vehicle model VM which reproduces vehicle motions on a real time basis by architecting parameterized parts characteristics which are items to be discussed in design. Virtual vehicle model VM is set by adding each element model of an engine, a drive train, a brake, and tires used exclusively for the development of the vehicle dynamics control system to a vehicle model (a suspension, a steering, and a chassis are set as element models) utilizing, for example, analysis and evaluation of steering stability and vehicle comfortability and by inputting a required characteristic value for each element model. It is noted that, in virtual vehicle model VM, each element model is selectable by a switch and each element model is switched so as to obtain a required model during an execution of the real time simulation.

The MATLAB/Simulink (trade mark) is a general-purpose modeling program and is used for the vehicle modeling and various kinds of environment settings. In this general-purpose modeling program, driver model DM and road surface environment model RM are programmed.

Figure 4:
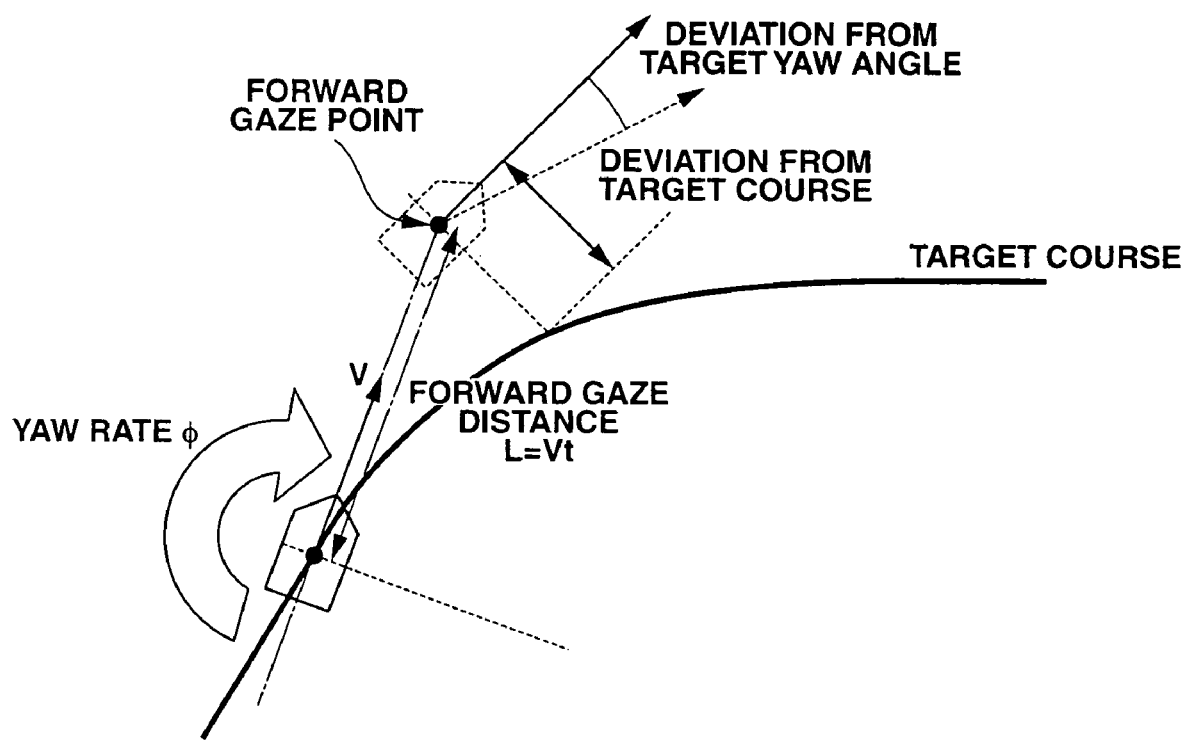
FIG. 4 is an explanatory view for explaining a concept of the driver model used in the assistance function evaluation apparatus for the vehicle dynamics control system shown in FIG. 1.
Figure 5:
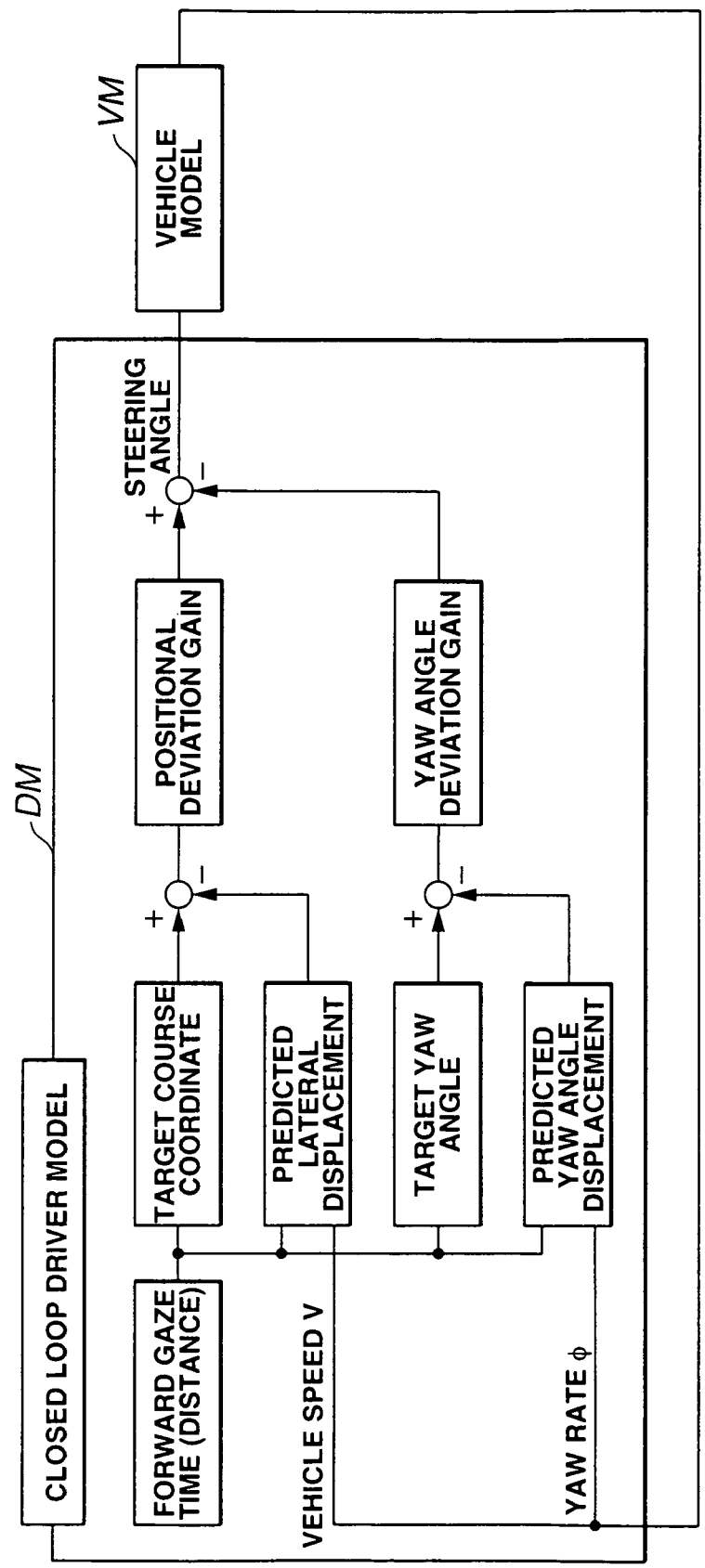
FIG. 5 is a block diagram representing a closed loop driver model used in the assistance function evaluation apparatus for the vehicle dynamics control system shown in FIG. 1.

Driver model DM (a closed loop driver model) detects a deviation between a vehicular lateral displacement which would be developed in a case where the vehicle is advanced to a forward gaze point with a present vehicle posture maintained, the forward gaze point being a point of place separated from the vehicle by a predetermined forward gaze distance L when the vehicle is present on a target course, as shown in FIG. 4, and the target course and a deviation between a yaw angular displacement and a target yaw angle. Then, driver model DM calculates a steering angle (steering angle of a steering wheel) imposed on the vehicle model by a feedback control using a positional deviation quantity (the deviation between the vehicular lateral displacement and the target course), a positional deviation gain, a yaw angle deviation quantity, and a yaw angle deviation gain (refer to FIG. 5). Forward gaze distance L is set according to a distance at which the vehicle would be present after a set time (after t seconds) in a case where a present vehicle speed V is maintained. In road surface environment model RM, for example, an obstacle avoidance course along both sides of which pylons are aligned is set as the target course used in the simulation in the first embodiment.

Real time simulator 2 downloads virtual vehicle model VM compiled in a format operated by a PPC (Power PC) and executes the simulation on the real time base for each of 1 millisecond clock time. For example, a motion of the virtual vehicle model on the obstacle avoidance course in which the VDC system is operated is such that when the steering wheel steering angle calculated by driver model DM is inputted, this steering angle of the steering wheel is converted into an actual steering angle of each road wheel and transmitted to each tire.

Input/Output (Port) Box 3 serves to input each sensor signal of road wheel velocities, a yaw rate ($\phi$), a lateral acceleration, and a steering angle (a calculated value of real time simulator 2 on the basis of the virtual vehicle model) required to activate VDC/TCS/ABS control unit 4 in a form of an analog signal via a D/A board into a VDC/TCS/ABS control unit 4 or in a form of a CAN (Car Area Network) signal via a CAN board. It is noted that since, in a brake liquid pressure system in the first embodiment, an actual system thereof is used, a pressure sensor value is directly inputted to VDC/TCS/ABS control unit 4 as a pressure. Each sensor value of the road wheel velocities, the yaw rate, the lateral acceleration, and the pressure is inputted to VDC/TCS/ABS control unit 4 for each of 1 milliseconds and a steering angle sensor value is inputted to VDC/TCS/ABS control unit 4 for each of 10 milliseconds. In addition, whether the system is normally operated is determined according to whether a warning lamp is illuminated.

VDC/TCS/ABS control unit 4 is a unit which is mounted as a real (actual) unit as will be described later, receives sensor signals from Input/Output box 3, and drivingly controls VDC/TCS/ABS actuator 6.

Master cylinder 5, VDC/TCS/ABS actuator 6, first wheel cylinder 7, second wheel cylinder 8, third wheel cylinder 9, and fourth wheel cylinder 10 are actual brake liquid pressure units mounted as the actual units as will be described later. First, second, third, and fourth wheel cylinder pressure sensors 13, 14, 15, 16 are installed at upstream positions of corresponding first, second, third, and fourth wheel cylinders 7, 8, 9, 10 to detect their corresponding wheel cylinder pressures and supply detected values to Input/Output (Port) box 3.

Figure 6:
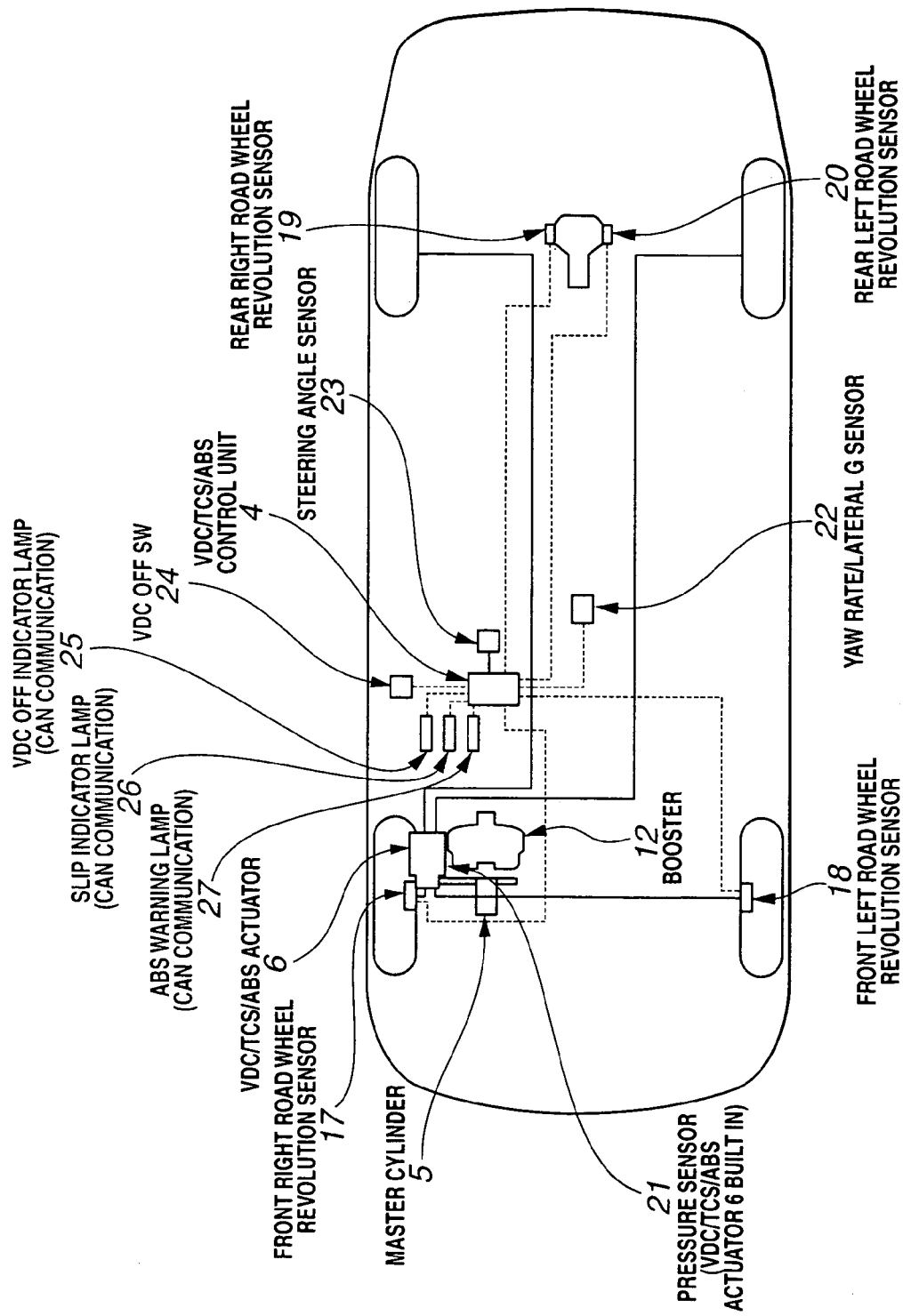
FIG. 6 is a block diagram representing a vehicle dynamics control system mounted in an actual vehicle.

FIG. 6 shows the VDC system mounted in the actual vehicle. The VDC system includes: VDC/TCS/ABS control unit 4; master cylinder 5; VDC/TCS/ABS actuator 6; booster 12; a front right wheel revolution sensor 17; a front left wheel revolution sensor 18; a rear right wheel revolution sensor 19; a rear left wheel revolution sensor 20; a pressure sensor 21; a yaw rate/lateral G (gravity) sensor 22; a steering angle sensor 23; a VDC off switch 24; a VDC off indicator lamp 25; a slip indicator lamp 26; and an ABS warning lamp 27. The VDC system is a system in which a sideslip of the vehicle is reduced by means of a four-wheel independent brake control, for example, during a lane change of the vehicle or a turn of the vehicle on a slippery road surface so that braking, start, and turning performances are made highly compatible and an improvement in a running stability is achieved.

FIG. 7 shows the brake liquid pressure control system. The brake liquid pressure control system includes: a brake pedal 28; a booster 12; master cylinder 5; VDC/TCS/ABS actuator 6; front left wheel cylinder 7; front right wheel cylinder 8; rear left wheel cylinder 9; and rear right wheel cylinder 10.

VDC/TCS/ABS actuator 6 is, as shown in FIG. 7, intervened between master cylinder 5 and each wheel cylinder 7, 8, 9, 10 and includes: a single motor 6a; a single pump 6b; two reservoirs 6c; two inlet valves 6d; two outlet valves 6e; two damper chambers 6f; four outlet solenoid valves 6g; four inlet solenoid valves 6h; four return check valves 6i; two front VDC switching valves 6j; two check valves 6k; two rear VDC switching valves 6m; and two check valves 6n. VDC/TCS/ABS actuator 6 switches each solenoid valve 6g, 6h, 6j, 6m in response to a signal from VDC/TCS/ABS control unit 4 and controls the liquid pressure of each wheel cylinder 7, 8, 9, 10. This brake liquid pressure control is carried out in a normal brake mode, a hold mode (in the VDC operation), a pressure decrease mode (in the VDC operation), and a pressure increase mode (in the VDC operation).

The VDC system detects a steering manipulated variable by the driver from steering angle sensor 23 and a brake manipulated variable by the driver from pressure sensor 21 and determines a vehicular running state (for example, a degree of an understeer or degree of an oversteer) from the information supplied from yaw rate/lateral G sensor 22 and each road wheel revolution sensor 17, 18, 19, 20. Then, according to the determination of the running state, in a case where the vehicle has a tendency of the understeer or of the oversteer, a four-wheel brake control (an engine output control is also used according to its necessity) is activated to improve a vehicular stability.

Figure 8A:
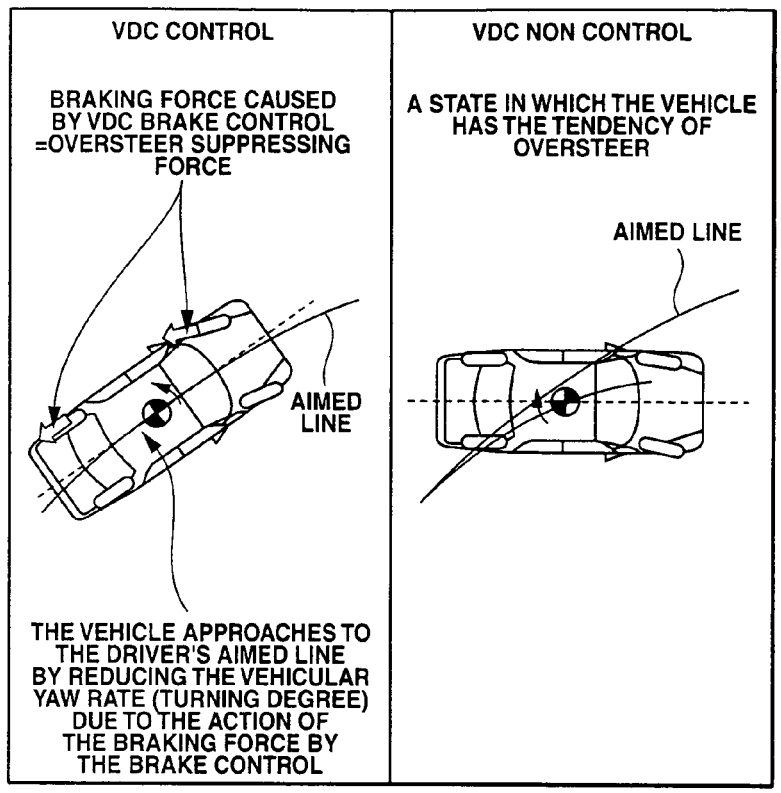
FIGS. 8A and 8B are explanatory views for explaining an oversteer tendency relieving action by means of a VDC control.
Figure 8B:
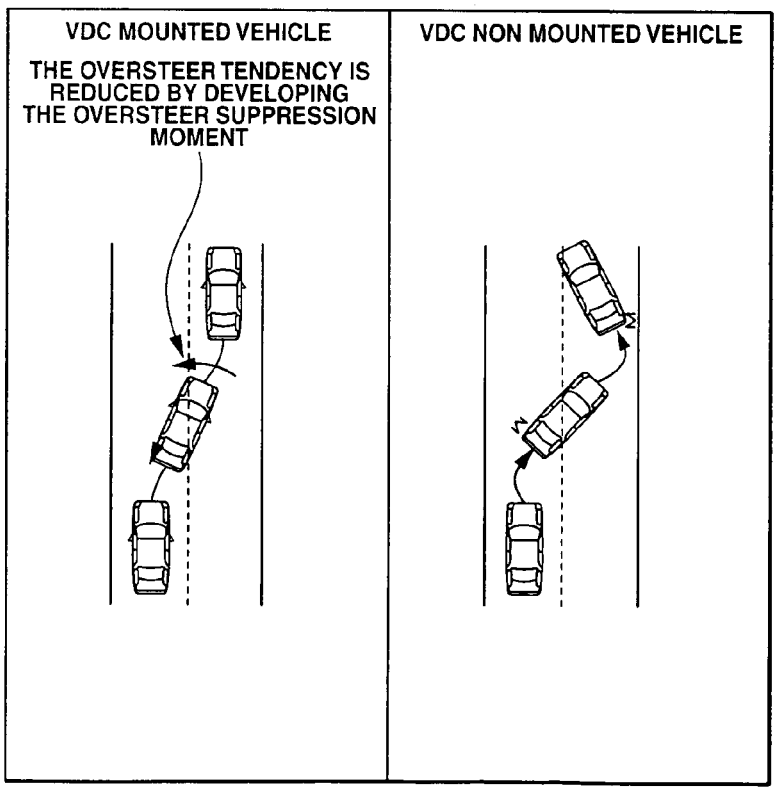

For example, as shown in FIGS. 8A and 8B, in the lane change of the vehicle on the slippery road surface, when the VDC system determines that the vehicle has a large tendency of the oversteer, an engine output is controlled and a braking force is controlled according to the degree of the oversteer and an oversteer suppression moment is developed to reduce the oversteer tendency. It is noted that the oversteer suppression moment (a force to suppress the oversteer) is developed by providing the braking force for the front and rear road wheels which are outside wheels with respect to a turning line.

Figure 9A:
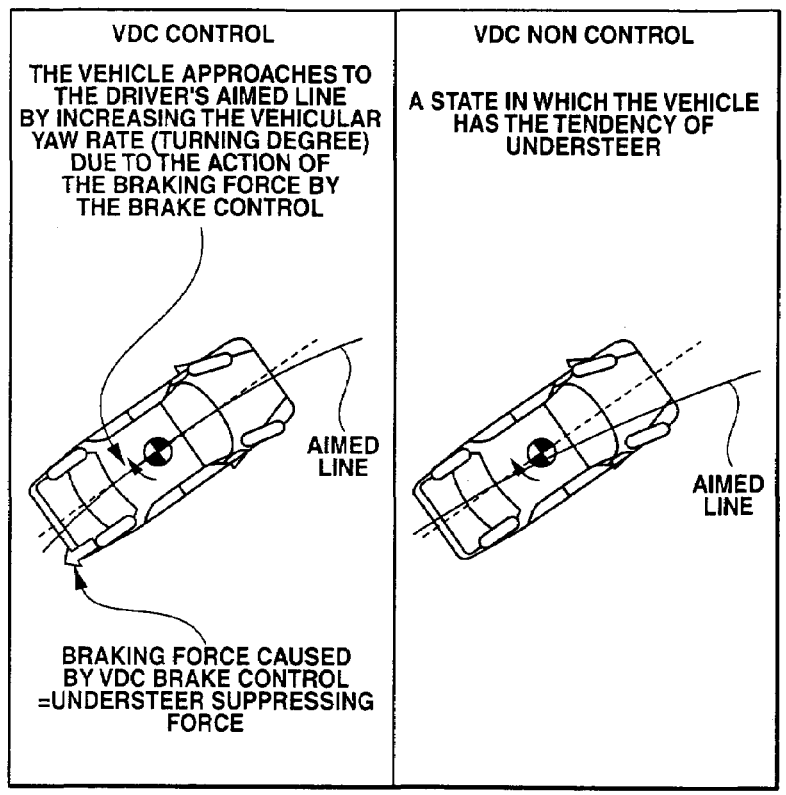
FIGS. 9A and 9B are explanatory views for explaining an understeer tendency relieving action by means of the VDC control.
Figure 9B:
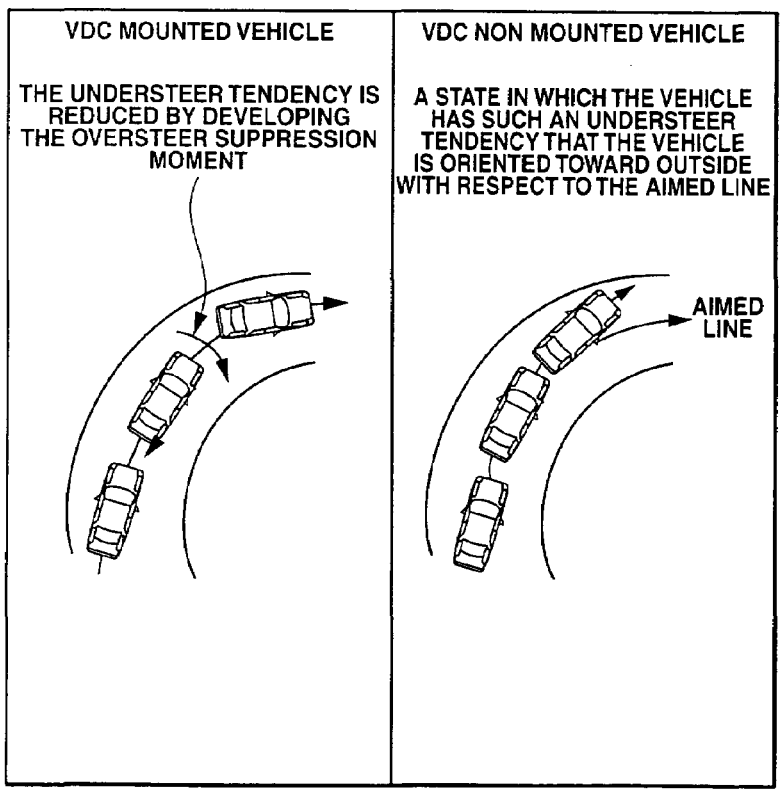

In addition, as shown in FIGS. 9A and 9B, in the lane change on the slippery road surface, when the VDC system determines that the vehicle has a large tendency of the understeer, the braking force is controlled according to the degree of the understeer and an understeer suppression moment is developed to reduce the understeer tendency. It is noted that the understeer suppression moment (a force to suppress the understeer) is developed by providing the braking force for one of the rear road wheels which is an inside wheel with respect to the turning line.

In other words, the VDC system function is a function which makes a vehicular sideslip quantity determined according to the information from the yaw rate/lateral G sensor 22 and each road wheel revolution sensor 17, 18, 19, 20 coincident with a target slip quantity determined according to the driver steering manipulated variable and the driver brake manipulated variable obtained from steering angle sensor 23 and pressure sensor 21.

On the other hand, an assistance function of the VDC system which is the object to be evaluated in the first embodiment is a balance function between an intention quantity that the driver has operated with an intention for the vehicle to move (or turn) in a lateral direction (hereinafter, called a driver intention quantity) and a VDC function quantity benefited from a vehicular motion correction function by means of the VDC system (hereinafter, called a system function quantity). In the first embodiment, grip limit vehicle speed and passage limit vehicle speed are obtained by an execution of a simulation in which the target course is traced using driver model DM, as the driver intention quantity, steering increment quantity B is used, and as the system function quantity, the assistance rate which is a division of the passage limit vehicle speed by the grip limit vehicle speed is used. Steering increment quantity B is a difference between a second steering quantity A2 which is the steering quantity at the time of the passage limit vehicle speed and a first steering quantity A1 which is the steering quantity at the time of the grip limit vehicle speed.

Next, an action of the first embodiment will be described below.

[An Assistance Function Evaluation Processing of the VDC System]

Figure 10:
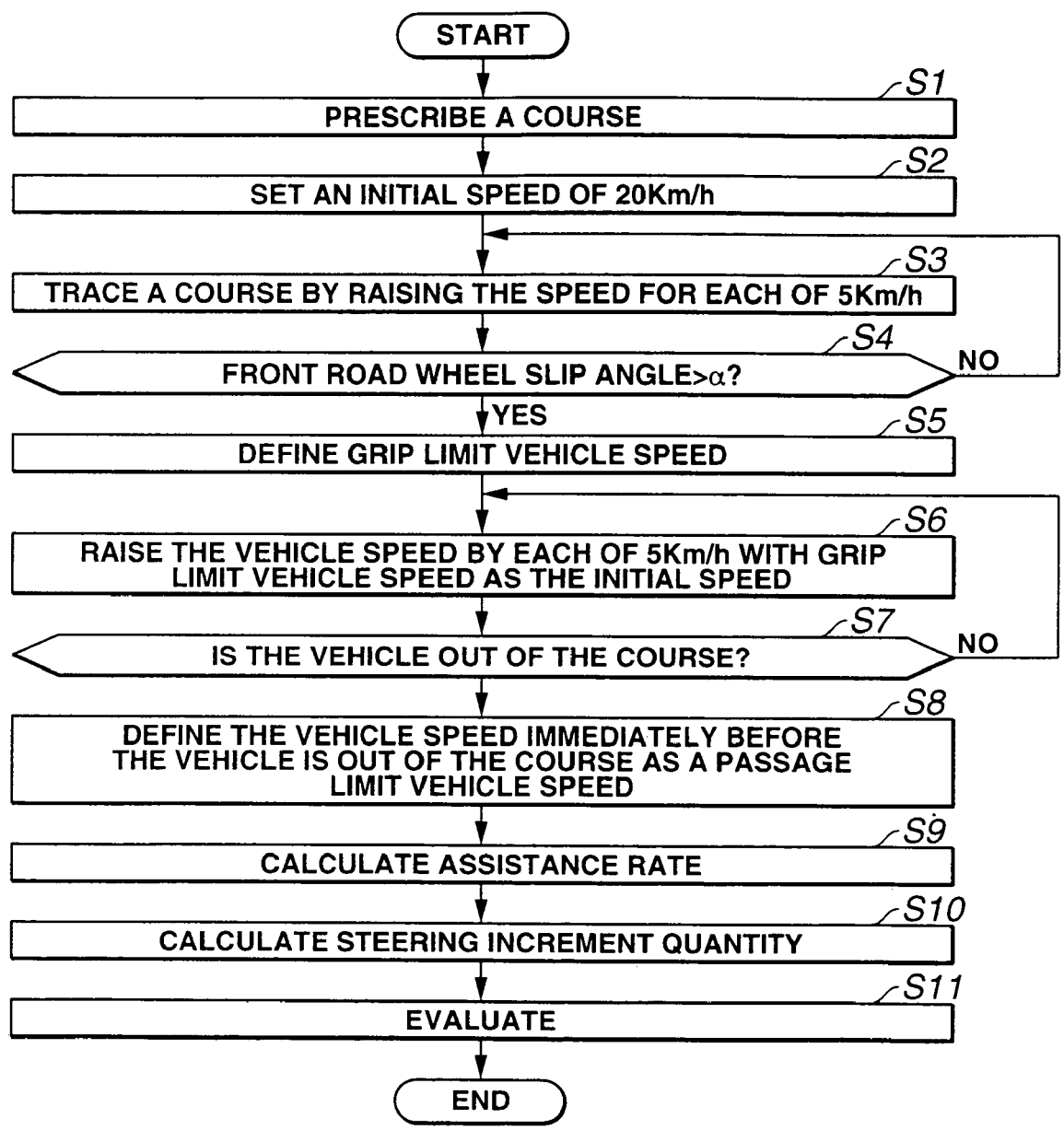
FIG. 10 is a flowchart representing an assistance function evaluation processing for the vehicle dynamics control system executed by a real time simulator of the assistance function evaluation apparatus shown in FIG. 1.

FIG. 10 shows a flowchart representing a flow of an assistance evaluation processing of the VDC system executed in real time simulator 2 in the first embodiment. At a step S1, real time simulator 2 prescribes the target course which is easy for the VDC system to be operated such as the obstacle avoidance course as a course at which the simulation is executed and the routine goes to a step S2.

At step S2, real time simulator 2, after the target course is prescribed at step S1, sets an initial vehicle speed of the simulation in which the vehicle traces the target course to 20 Km/h and the routine goes to a step S3. At step S3, real time simulator 2, after the initial vehicle speed setting, executes the simulation such that the vehicle traces the target course at the first time at the vehicle speed of 20 Km/h, executes the simulation such that the vehicle traces the target course at the second time or more at the vehicle speed of 25 Km/h or higher with the vehicle speed raised by a unit of 5 Km/h (for each of 5 Km/h) and the routine goes to a step S4.

At step S4, real time simulator 2, after the execution of the simulation at step S3, determines whether a front road wheel slip angle is in excess of $\alpha$ (a grip limit determination threshold value). If Yes at step S4, the routine goes to a step S5. If No at step S4, the routine returns to step S3. Then, at step S3, the simulation is again executed with the vehicle speed raised by each of 5 Km/h.

At step S5, real time simulator 2 defines the vehicle speed immediately before the front road wheel slip angle is in excess of threshold value $\alpha$ as the grip limit vehicle speed on the basis of the determination at step S4 that the front road wheel slip angle is in excess of threshold value $\alpha$ and the routine goes to a step S6. The grip limit vehicle speed is a limit vehicle speed of the vehicle in which no VDC system is mounted. For example, in a case where the front road wheel slip angle is in excess of grip limit determination threshold value $\alpha$ at the vehicle speed of 65 Km/h, the grip limit vehicle speed is 60 Km/h. In addition, the steering quantity during the grip limit vehicle speed is first steering quantity A1.

At step S6, real time simulator 2, after the definition of the group limit vehicle speed, executes the simulation such that the vehicle traces the target course with the grip limit vehicle speed as the initial vehicle speed and with the vehicle speed raised by a unit of 5 Km/h and the routine goes to a step S7. At step S7, real time simulator 2, after the execution of the simulation at step S6, determines whether the vehicle goes out of the target course (so called, course out). If Yes at step S7, the routine goes to a step S8. If No at step S8, the routine returns to step S6 at which the simulation is again executed with the vehicle speed raised by the unit of 5 Km/h.

At step S8, real time simulator 2 defines the vehicle speed immediately before the vehicle goes out of the target course (course out) as the passage limit vehicle speed on the basis of the determination that the vehicle goes out of the target course (course out) at step S7 and the routine goes to a step S9.

Figure 11:
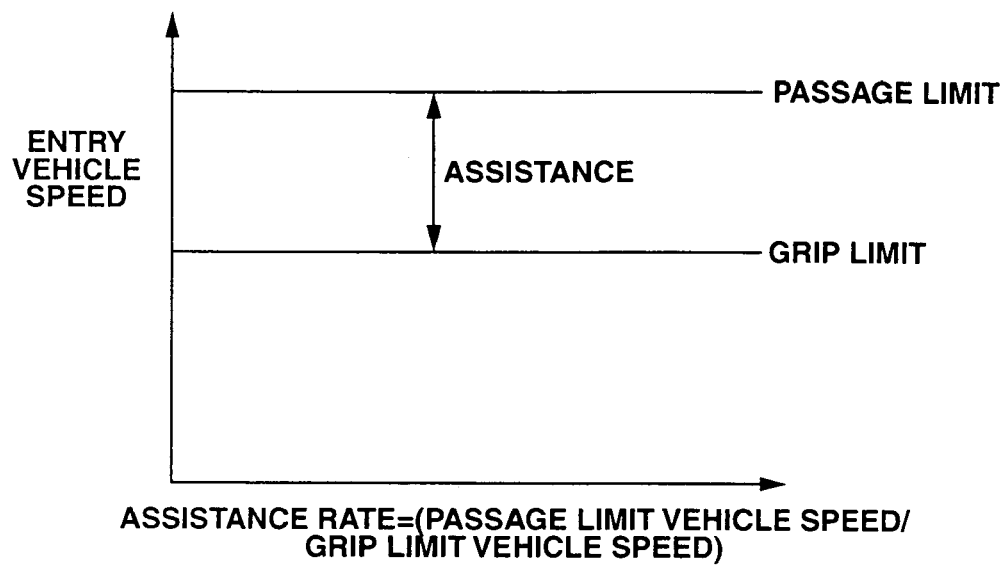
FIG. 11 is an explanatory view for explaining an assistance rate used in a system function quantity in the assistance function evaluation apparatus for the vehicle dynamics control system shown in FIG. 1.

At step S9, real time simulator 2, after the determination of the passage limit vehicle speed at step S8, calculates the assistance rate using the grip limit vehicle speed defined at step S5 and the passage limit vehicle speed defined at step S8 and the routine goes to a step S10 (a system functions quantity detecting section (means)). The assistance rate is, as shown in FIG. 11, calculated as follows: assistance rate=(passage limit speed/grip limit vehicle speed). The assistance rate is a percentage representing that the difference between the passage limit vehicle speed and the grip limit vehicle speed is the vehicle speed corresponding to the assistance. At step S10, real time simulator 2, after the calculation of the assistance rate at step S9, calculates steering increment quantity B (=A2−A1) using first steering quantity A1 at the grip limit vehicle speed defined at step S5 and second timing quantity A2 defined at step S8 and the routine goes to a step S11 (a driver intention quantity detecting section (means)).

Figure 12:
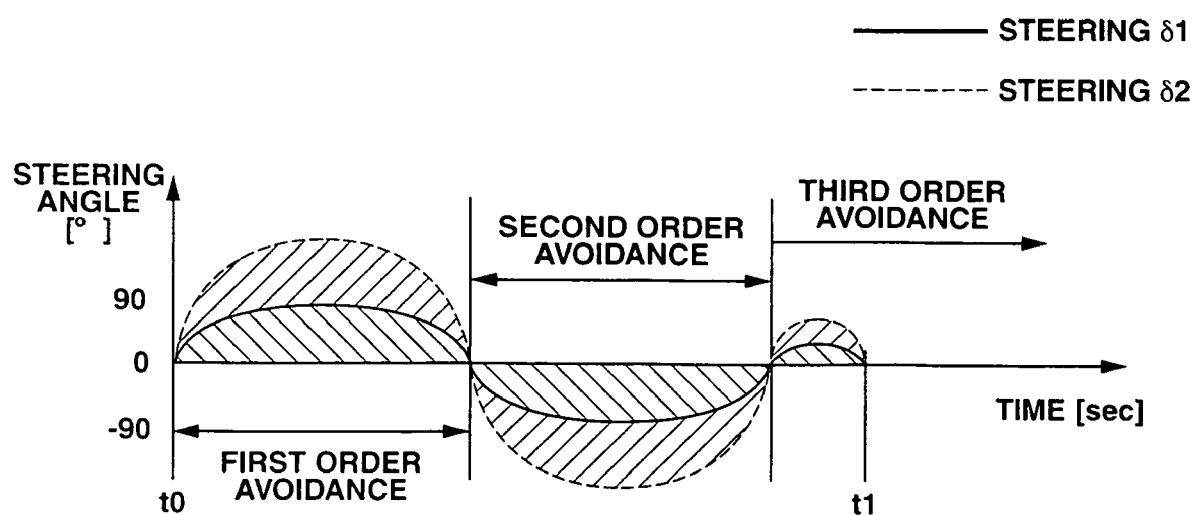
FIG. 12 is a steering angle timing chart for explaining a steering increment quantity used as a driver intention quantity in the assistance function evaluation apparatus for the vehicle dynamics control system shown in FIG. 1.

For steering increment quantity B, for example, as shown in FIG. 12, in a case where a first-order avoidance, a second-order avoidance, and a third-order avoidance are carried out, first steering quantity A1 is calculated in the following equation: first steering quantity A1=∫δ1(t)dt (an integration value which derives an area enclosed with a steering δ1 from a time t0 to a time t1) and second steering quantity δ2 is calculated in the following equation: second steering quantity A2=∫δ2(t)dt (an integration value which drives an area enclosed by a steering δ2 from time t0 to time t1).

Figure 13:
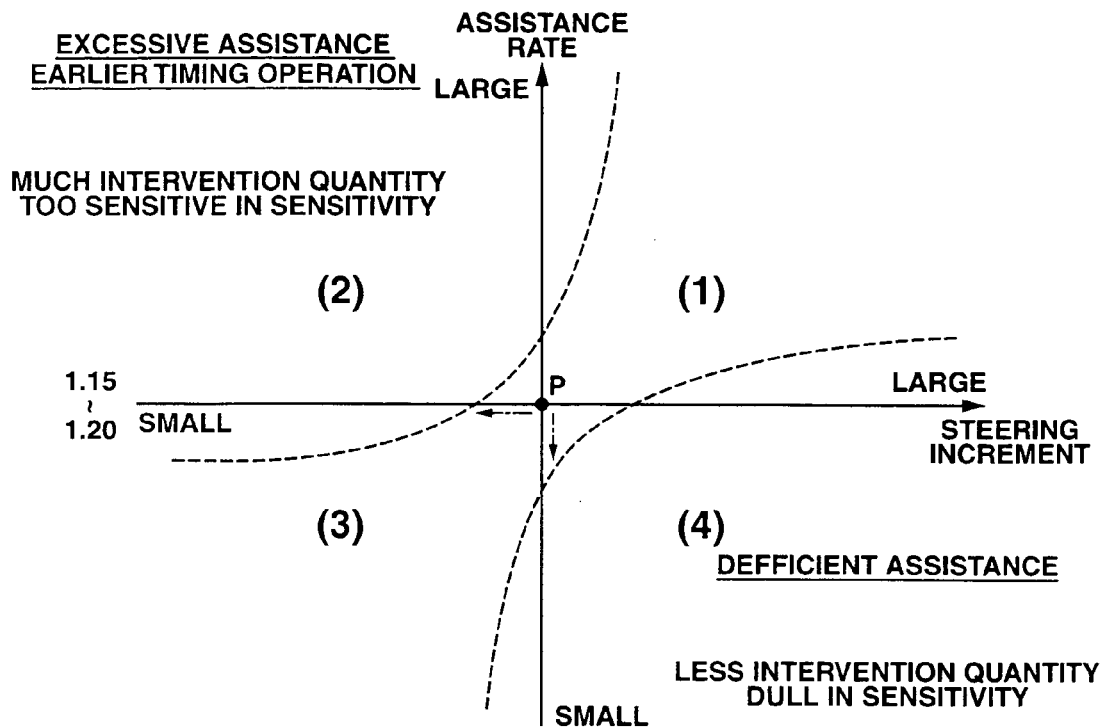
FIG. 13 is a map view representing a first assistance function evaluation map used as an evaluation data of the assistance function in the assistance function evaluation apparatus for the vehicle dynamics control system shown in FIG. 1.

At step S11, real time simulator 2 after the calculation of steering increment quantity B at step S10, evaluates that the assistance function of the VDC system is in conformity to the driver when an evaluation point determined according to the calculated steering increment quantity B and assistance rate on a first assistance function evaluation map shown in FIG. 13 is present on a region (1) in which both of steering increment quantity B and assistance rate are relatively large or a region (3) in which both of steering increment quantity B and assistance rate are relatively small and evaluates that excess or deficiency is present in the assistance function of the VDC system and the assistance function of the VDC system is not in conformity to the driver when the evaluation point is present in either region (2) or (4) in which one of steering increment quantity B and assistance rate is relatively large and the other is relatively small and the routine is ended. It is noted that, for example, when steering increment quantity B and the assistance rate are present within region (2) on the first assistance function map, real time simulator 2 evaluates that an intervention quantity of the VDC system is much and a sensitivity thereof is sensitive, reduces an operation sensitivity of the VDC system, and executes repeatedly the simulation until the evaluation point is present on region (1) or region (3). In addition, when steering increment quantity B and the assistance rate are present within region (4) on the first assistance function map, real time simulator 2 evaluates that the intervention quantity of the VDC system is a little and the operation sensitivity thereof is dull, increases the operation sensitivity of the VDC system, and executes repeatedly the simulation until the evaluation point is present in either region (1) or (3).

[Setting of First Assistance Function Evaluation Map]

Real time simulator 2 sets the first assistance function evaluation map shown in FIG. 13 in which a lateral axis (a first axis) denotes the steering increment quantity (driver intention quantity), a longitudinal axis (a second axis) denotes the assistance rate (system function quantity), and the lateral axis is intersected with the longitudinal axis (a first assistance function evaluation map setting section (means)).

This first assistance evaluation map is used to evaluate whether the assistance function of the VDC system is in conformity to the driver depending upon in which region of (1), (2), (3), or (4) the evaluation point determined according to the calculated steering increment quantity B and assistance rate is present. An intersecting point P between the lateral axis and the longitudinal axis of the first assistance function evaluation map is a point at which the front wheel tire on the lateral axis indicates the steering quantity (=first steering quantity A1) at the grip limit vehicle speed (front road wheel slip angle α) and a point at which the VDC system on the longitudinal axis exhibits the assistance rate (=1.15 through 1.20) without excess or deficiency.

A position of intersecting point P between the lateral axis and the longitudinal axis of the first assistance function evaluation map is variably set according to the following conditions.

①As a wheel base or a tread becomes larger, intersecting point P on the first assistance function evaluation map (shown in FIG. 13) is set to a position on the lateral axis moved in a direction in which steering increment quantity B becomes smaller. That is to say, as the vehicle wheel base or tread becomes larger, a vehicle motion stability is high. Hence, a range of a large side of steering increment quantity in conformity evaluation region (1) is expanded.

②As a steering gear ratio of the vehicle becomes quicker, intersecting point P is set to a position on the lateral axis moved in a direction in which steering increment quantity B becomes smaller. That is to say, when the steering gear ratio becomes quick, a substantial steering increment quantity becomes small. Hence, a range of a large side of steering increment quantity B in conformity evaluation region (1) is expanded.

③As a potential of a base model vehicle becomes higher, intersecting point P is set to a position on the longitudinal axis moved in a direction in which the assistance rate becomes smaller. That is to say, even if as the potential of the base model vehicle becomes higher, the assistance rate becomes larger, this is allowed. Thus, a range of a large side of the assistance rate in conformity evaluation region (1) is expanded.

④As a coefficient of friction on a road (surface) becomes lower, intersecting point P is set to a position on the longitudinal axis moved in a direction in which the assistance rate becomes smaller. That is to say, as the running road surface has a lower coefficient of friction on the road, the operation intervention quantity of the VDC system is allowed. Hence, the range of the large side of the assistance rate of conformity evaluation region (1) is expanded.

⑤As an entry vehicle speed to the target course becomes higher, intersecting point P is set to be a position on the longitudinal axis moved in a direction in a direction in which the assistance rate becomes smaller. That is to say, as the entry vehicle speed to the target course becomes higher, the operation sensitivity of the VDC system is needed to be increased. Hence, the range of the large side of the assistance rate in conformity evaluation region (1) is expanded. It is noted that region (1) in FIG. 13 is also called a first region, region (3) in FIG. 13 is also called a third region, region (2) in FIG. 13 is also called a second region, and region (4) in FIG. 13 is also called a fourth region.

[Driver Model DM]

Driver model DM in the first embodiment detects the deviation between the vehicular lateral displacement which would be developed in the case where the vehicle is advanced to the forward gaze point with the present vehicle posture maintained, the forward gaze point with the present vehicle posture maintained, the forward gaze point being the point of place separated from the vehicle by predetermined forward gaze distance L when the vehicle is present on the target course, as shown in FIG. 4, and the target course and the deviation between the yaw angular displacement and the target yaw angle. Then, as shown in the block diagram of FIG. 5, driver model DM calculates the steering angle imposed on vehicle model VM by the feedback control in which a value of a position deviation quantity (an output difference between a target course coordinate and a predicted lateral displacement multiplied by a positional deviation gain is added (actually subtracted) to a value of the yaw angle deviation quantity (an output difference between a target yaw angle and a predicted yaw angle displacement) multiplied with a yaw angle deviation gain. That is to say, the steering operation by the driver is handled as a feedback control operation for the predicted vehicle position and the vehicle motion at the forward gaze point. Thus, the running situation in which the motion of the vehicle in which the VDC system is operated is varied can be reproduced with good accuracy through vehicle model VM. Furthermore, forward gazing distance L is set according to distance L=V·t at which the vehicle would be present after the set time (after t seconds) in a case where present vehicle speed V is maintained. Thus, the driver gazes a remote place when the vehicle runs at a high speed and the driver gazes a near place when the vehicle runs at a low speed. Irrespective of the vehicle speed, a driver's response delay (dead time) can be made constant. It is noted that the yaw angle displacement after t second can be derived as $\phi t$ ($\phi$ denotes a yaw rate).

[Assistance Function Evaluation Action for VDC System]

The assistance evaluation action of the VDC system in the first embodiment is such that real time simulator 2 obtains the grip limit vehicle speed and the passage limit vehicle speed by executing the simulation using virtual vehicle model VM, road surface environment model RM, and driver model DM. In details, in the flowchart of FIG. 10, the routine advances as step S1→step S2→step S3→step S4. Until the front road wheel slip angle reaches to grip limit determination threshold value a, the flow of step S3→step S4 is repeated. If the front road wheel slip angle reaches to grip limit determination threshold value $\alpha$, the routine goes to step S5. At step S5, the vehicle speed immediately before the front road wheel slip angle is in excess of grip limit determination threshold value $\alpha$ is defined a the grip limit vehicle speed. At the same time, the steering quantity at the time of the grip limit vehicle speed is set as first steering quantity A1.

Thereafter, in the flowchart of FIG. 10, until the vehicle goes out of the target course (course out), the flow of step S6→step S7 is repeated. At step S7, if real time simulator 2 determines that the vehicle is contacted with any pylon on the obstacle avoidance course and goes out of the course (course out), the routine goes to step S58. At step S58, real time simulator 2 defines the vehicle speed immediately before the vehicle goes out of the course (course out) as the passage limit vehicle speed. At the same time, the steering quantity at the time of the passage limit vehicle speed is second steering quantity A2. At step S9 in the flowchart of FIG. 10, real time simulator 2 calculates the assistance rate by dividing the passage limit vehicle speed with the grip limit vehicle speed and at step S10 real time simulator 2 calculates steering increment quantity B by deriving the difference between second steering quantity A2 at the time of the passage limit vehicle speed and first steering quantity A1 at the time of the grip limit vehicle speed.

Next, at step S11, when, on the first assistance function evaluation map shown in FIG. 13, the evaluation point determined according to calculated steering increment quantity B and assistance rate is present on region (1) in which both of steering increment quantity B and assistance rate are relatively large or on region (3) in which both of steering increment quantity and assistance rate are relatively small, real time simulator 2 evaluates that the assistance function of the VDC system is in conformity to the driver. When the evaluation point is present on region (2) or (4) in which one of steering increment quantity B and assistance rate is relatively large and the other is relatively small, real time simulator 2 evaluates that the assistance function of the VDC system has excess or deficiency and is not in conformity to the driver.

In other words, in a case where steering increment quantity B and assistance rate are balanced without excess or deficiency, real time simulator 2 evaluates that the assistance function of the VDC system is in conformity to the driver. In a case of an assistance excess in which the assistance rate is excessively large with respect to steering increment quantity B and in a case of an assistance deficiency in which the assistance rate is too small with respect to steering increment quantity B, real time simulator 2 evaluates that the assistance function of the VDC system is not in conformity with the driver. Consequently, real time simulator 2 can evaluate with good (high) accuracy whether the assistance function of the VDC system is proper to the driver (appropriate to the driver).

Next, advantages of driver model DM and the assistance function evaluation apparatus in which the driver model is equipped in the first embodiment will be described below.

(1) In driver model DM used when the travel along the set target course is reproduced through the simulation, driver model DM detects the deviation between the vehicular lateral displacement which would be developed in the case where the vehicle is advanced to the forward gaze point with the present vehicle posture maintained, the forward gaze point being the point of place separated from the vehicle by predetermined forward gaze distance L when the vehicle is present on the target course and the target course and the deviation between the yaw angle displacement and target yaw angle and calculates the steering angle imposed on vehicle model VM by the feedback control using the positional deviation quantity and the positional deviation gain and the yaw angle deviation quantity and yaw angle deviation gain. Hence, the steering operation by the driver is handled as the feedback operation for the predicted vehicle position and the vehicle motion at the forward gaze point. Thus, the running situation in which the motion of the vehicle is varied can be reproduced with good accuracy through vehicle model VM.

(2) Since forward gaze distance L is set according to distance $L=V \cdot t$ at which the vehicle would be present after set time t in a case where present vehicle speed V is maintained, the response delay of the driver (dead time) can be made constant irrespective of the vehicle speed.

(3) In the assistance function evaluation apparatus for the vehicle dynamics control system including the VDC system which is the object to be evaluated, models modeled for the other vehicle elements than the VDC system, and real time simulator 2 that obtains the data base when the VDC system is operated on the real time basis, the assistance function evaluation apparatus further includes vehicle model VM that is architected with the parts characteristics of the vehicle which is the object to be evaluated parameterized, road surface environment model RM that calculates the steering angle imposed on vehicle model VM which is traced on the target course. Real time simulator 2 includes: the driver intention quantity detecting section (means) that detects the intention quantity of the driver to move the vehicle in the lateral direction and the system function quantity detecting section (means) that detects the system function quantity of the vehicle dynamics control (VDC) system and evaluates that the assistance function of the control system is in conformity to the driver in a case where the system function quantity and the driver intention quantity are balanced without excess or deficiency. Therefore, real time simulator 2 can evaluate with good accuracy whether the assistance function of the VDC system is appropriate to the driver.

(4) The driver intention quantity detecting section (means) of real time simulator 2 obtains the grip limit vehicle speed and the passage limit vehicle speed by the execution of the simulation in which the target course is traced using driver model DM and is a section (means) that calculates steering increment quantity B according to the difference between second steering quantity at the time of the passage limit vehicle speed and first steering quantity A1 which is the steering quantity at the time of the grip limit vehicle speed. Hence, the steering increment quantity to which the driver is applied in the VDC operation region can be detected with the good accuracy as the driver intention quantity. In other words, the grip limit vehicle speed is the limit vehicle speed at a reference vehicle in which the VDC system is not equipped and the passage limit vehicle speed is the limit vehicle speed of the vehicle which is the object to be evaluated and in which the VDC system is operated.

(5) The system function quantity detecting means (section) of real time simulator 2 obtains the grip limit vehicle speed and the passage limit vehicle speed by the execution of the simulation in which the target course is traced using driver model DM and is a section (means) that calculates the assistance rate by dividing the passage limit vehicle speed by the grip limit vehicle speed. According to the value replaced by a vehicle speed ratio, the system function quantity in an VDC operation region can be detected with good accuracy.

(6) The system function quantity detecting section uses driver model DM, vehicle model VM, and road surface environment model RM to execute the simulation in which the prescribed target course is traced with the vehicle speed raised by the unit of a set vehicle speed width, defines the vehicle speed immediately before the front road wheel slip angle is in excess of the predetermined threshold value ($\alpha$) as the grip limit vehicle speed, and defines the vehicle speed immediately before the vehicle goes out of the target course as the passage limit speed. Hence, it is possible to obtain the grip limit vehicle speed and the passage limit vehicle speed with good accuracy by executing the simulation with the vehicle speed raised by the unit of the small set vehicle speed width.

(7) Real time simulator 2 includes the first assistance function evaluation map setting section in which, with the lateral axis as the driver intention quantity and with the longitudinal axis as the system function quantity, the first assistance function evaluation map in which the lateral axis is intersected with the longitudinal axis is set. When, on the first assistance function evaluation map, the evaluation point determined according to the detected driver intention quantity and the system function quantity is present in the region ((1) or (3) in FIG. 13) in which both of the driver intention quantity and the system function quantity are large or small, the assistance function of the control system is evaluated to be in conformity to the driver. When the evaluation point is present in the region ((2) or (4) in FIG. 13) in which one of the driver intention quantity and the system function quantity is large but the other is small, the assistance function of the control system has the excess or deficiency and is evaluated not to be in conformity to the driver. Hence, with the first assistance function evaluation map as the evaluation data, whether the assistance function is in conformity to the driver can easily be evaluated.

(8) Intersecting point P between the lateral axis and the longitudinal axis of the first assistance function map is a point indicating the driver intention quantity at the grip limit of the front road wheel tire on the lateral axis and a point indicating the system function quantity at which the VDC system on the longitudinal axis exhibits the assistance function without excess or deficiency. Hence, an appropriate assistance function evaluation can be made according to four divided regions with a point at which the driver intention quantity and the system function quantity are approximately coincident with reference values at the actual vehicle.

(9) Since intersecting point P between the lateral axis and longitudinal axis of the first assistance evaluation function map is set to a position moved in the direction in which, as the wheel base or tread of the vehicle becomes larger, the driver intention quantity on the lateral axis becomes smaller, the driver intention quantity range of the conformity evaluation region can be set to an appropriate range according to the motion stability of the vehicle which is the object to be evaluated determined according to the wheel base or tread.

(10) Since intersecting point P between the lateral axis and the longitudinal axis of the first assistance function evaluation map is set to the position moved in the direction in which, as the steering gear ratio of the vehicle becomes quicker, the driver intention quantity on the lateral axis becomes smaller, the driver intention quantity range in the conformity evaluation region can be set to the appropriate range according to a magnitude of the steering gear ratio of the vehicle which is the object to be evaluated.

(11) Since intersecting point P between the lateral axis and the longitudinal axis of the first assistance function evaluation map is set to the position moved in the direction in which, as the potential of the base model vehicle becomes higher, the system function quantity on the longitudinal axis becomes smaller, the system function quantity range in the conformity evaluation region can be set to the appropriate range according to the height of the potential of the base model vehicle.

(12) Since intersecting point P between the longitudinal axis and the lateral axis of the first assistance function evaluation map is set to the position moved in the direction in which, as the coefficient of friction on the road becomes lower, the system function quantity on the longitudinal axis becomes smaller, the system function quantity range of the conformity evaluation region can be set to the appropriate range according to the road surface friction coefficient of the set target course.

(13) Since intersecting point P between the longitudinal axis and the lateral axis of the first assistance function evaluation map is set to the position moved in the direction in which, as the entry vehicle speed to the target course becomes higher, the system function quantity on the longitudinal axis becomes smaller, the system function quantity range of the conformity evaluation region can be set to the appropriate range according to the entry vehicle speed to the set target course.

Second Embodiment

Figure 14:
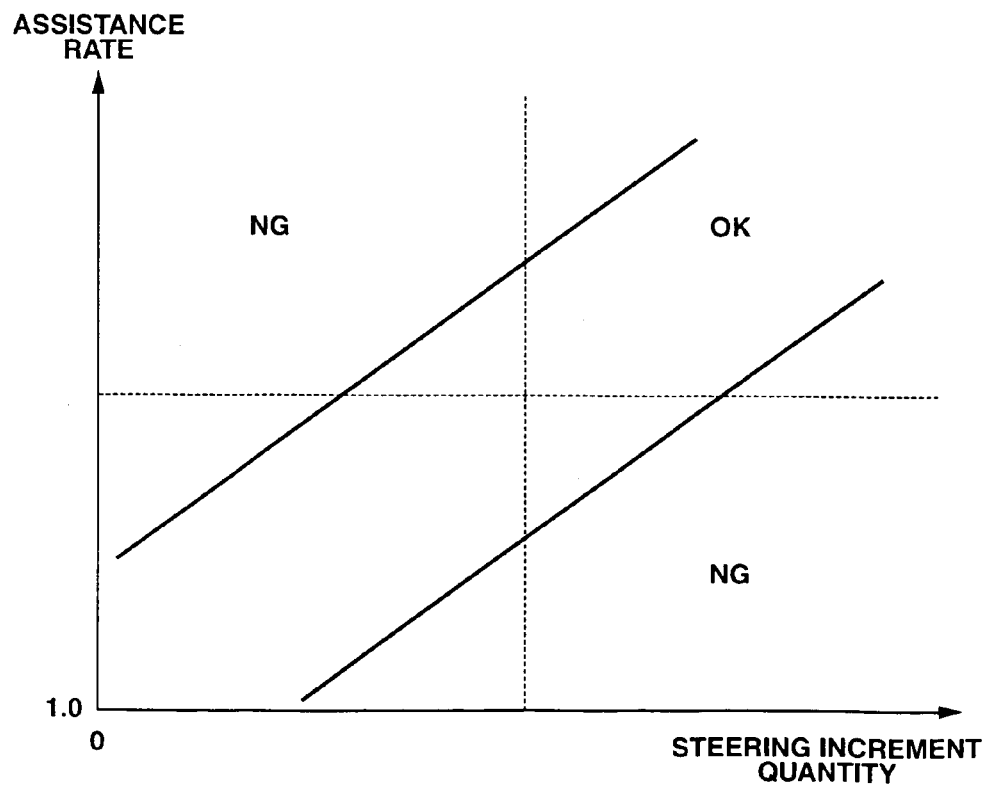
FIG. 14 is a map view representing a second assistance function evaluation map used as the evaluation date of the assistance function in the assistance function evaluation apparatus for the vehicle dynamics control system in a second preferred embodiment.

In a second preferred embodiment of the driver model and the assistance function evaluation apparatus for the vehicle dynamics control system in which the driver model is equipped, the assistance function evaluation map as the evaluation data of the assistance function evaluation map as the evaluation data of the assistance function is different from the first assistance function evaluation map described in the first embodiment. That is to say, real time simulator 2 includes a second assistance function evaluation map setting section in which a second assistance function evaluation map (FIG. 14) with the lateral axis (first axis) as the steering increment quantity (driver intention quantity) and with the longitudinal axis (second axis) as the assistance rate (system function quantity) is set. On the second assistance function evaluation map, a belt-like region in which the steering increment quantity and the assistance rate are proportionally varied is a conformity evaluation zone (so called, OK zone). When the evaluation point determined according to the calculated steering increment quantity and assistance rate are present in the conformity zone, the assistance function of the VDC system is evaluated to be in conformity to the driver. When the evaluation point is out of the conformity zone (so called, NG zone), the assistance function of the VDC system has excess or deficiency and is evaluated to be not in conformity to the driver. It is noted that, since the other structure and action are the same as those described in the first embodiment, the description thereof will herein be omitted.

Next, the advantage in the second embodiment will be described. In addition to advantage items (3) through (6) described in the first embodiment, the following advantage can be achieved. (14) Real time simulator 2 includes second assistance function evaluation map setting section in which the second assistance function evaluation map with the lateral axis as the steering increment quantity and the longitudinal axis as the assistance rate is set. On the second assistance function evaluation map, the belt-like region in which the steering increment quantity and the assistance rate are proportionally varied is set as the conformity zone. When the evaluation point determined according to the steering increment quantity and the assistance rate are present in the conformity zone, the assistance function of the VDC system is evaluated to be in conformity to the driver. When the evaluation point is out of the conformity zone, the assistance function of the VDC system has excess or deficiency and is evaluated to be not in conformity to the driver. Hence, with the second assistance function evaluation as the evaluation data, the evaluation of whether the assistance function is in conformity to the driver can easily be carried out.

Third Embodiment

In a third preferred embodiment of the driver model and assistance function evaluation apparatus for the vehicle dynamics control system in which the driver model is equipped, the assistance function evaluation map as the assistance function evaluation map is different from that described in each of the first and second preferred embodiments.

Figure 15:
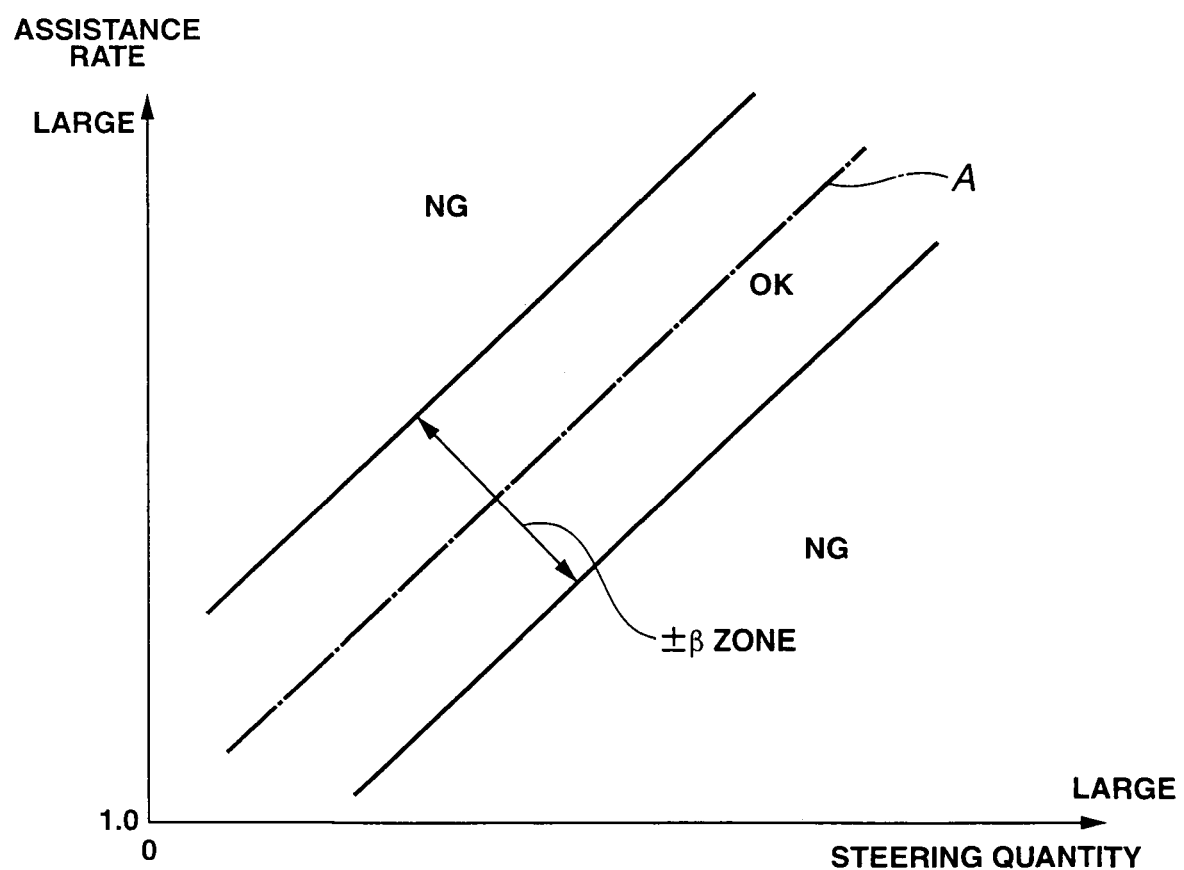
FIG. 15 is a map view representing a third assistance function evaluation map used as the evaluation data of the assistance function in the assistance function evaluation apparatus in the assistance function evaluation apparatus for the vehicle dynamics control system in a third preferred embodiment.

That is to say, real time simulator 2 includes a third assistance function evaluation map setting section in which a third assistance function evaluation map (FIG. 15) with the lateral axis (first axis) as the steering quantity (driver intention quantity) and with the longitudinal axis (second axis) as the assistance rate (system function quantity) is set. It is noted that the steering quantity which denotes the lateral axis of the third assistance function map shown in FIG. 15 corresponds to second steering quantity A2 described in the first embodiment. Alternatively, the steering quantity may correspond to first steering quantity A1. On the third assistance function evaluation map, the belt-type region in which an allowable width ±β is set with respect to a reference characteristic A which is already evaluated to be in conformity to the driver is set is set as the conformity zone (so-called, OK zone). When the evaluation point determined according to the calculated steering quantity and the assistance rate is present in the conformity zone (OK zone), the assistance function of the VDC system is evaluated to be in conformity to the driver. When the evaluation point is out of the conformity zone (is in NG zone), the assistance function of the VDC system has excess or deficiency and is evaluated to be not in conformity to the driver. The other structure and action are the same as those of the first embodiment and the description thereof will herein be omitted.

Next, the advantage in the third embodiment will be described. In addition to the advantage items (3) through (6) described in the first embodiment, the following advantage can be achieved. (15) Real time simulator 2 includes the third assistance function evaluation map setting section in which the third assistance function evaluation map with the lateral axis as the steering quantity and the longitudinal axis as the assistance rate is set. On the third assistance function evaluation map, the belt-like region in which the allowable width ±β with respect to reference characteristic A which is already evaluated to be in conformity to the driver is set is set as the conformity zone. When the evaluation point is present in the conformity zone, the assistance function of the VDC system is evaluated to be in conformity to the driver. When the evaluation point is out of the conformity zone, the assistance function of the VDC system has excess or deficiency and is evaluated to be not in conformity to the driver. Hence, with the third assistance function evaluation map as the evaluation data, whether the assistance function is in conformity to the driver can easily be evaluated.

As described hereinabove, the driver model and the assistance function evaluation apparatus for the vehicle dynamics control system in which the driver model is equipped according to the present invention have been described on the basis of the first through third embodiments. A specific structure is not limited to these embodiments. Various changes and modifications and additions may be made without departing from the scope of the appended claims.

In the first embodiment, as the vehicle dynamics control system, an example of the VDC system in which the braking force is applied through the brake liquid pressure so as to secure the stability of the vehicle motion. However, the anti-lock brake system may be included in the vehicle dynamics control system. Furthermore, the vehicle dynamics control system which secures the stability of the vehicle motion using another braking force (a regenerative braking force or engine brake force) than the brake liquid pressure may be included. In addition, such a vehicle dynamics control system that the vehicle motion stability is secured through a driving force distribution or a braking force distribution, or driving/braking force control may be included.

In the first embodiment, as the first assistance function evaluation map, the lateral axis is intersected with the longitudinal axis to divide the evaluation region into four regions. However, nonlinear characteristic lines are written into the first assistance function evaluation map as denoted by dot lines in FIG. 13 and the region enclosed with the two nonlinear characteristics may be set as the conformity zone.

In each of the first and second embodiments, the steering increment quantity is used as the driver intention quantity. In the third embodiment, the steering quantity is used as the driver intention quantity. If the driver intention quantity is a physical quantity reflecting an intention of the driver to move (or turn) the vehicle in the lateral direction, a steering integration value or a steering peak value may be used.

In each of the first, second, and third embodiments, the assistance rate according to the vehicle speed ratio is used as the system function quantity. However, an assistance rate according to a yaw motion ratio or other system function quantity corresponding value may be used if it is a value indicating the system function quantity according to the operation of the vehicle dynamics control system.

In the first embodiment, the positional correction of intersecting point P of the first assistance function evaluation map is carried out according to the wheel base of the vehicle, the tread thereof, the steering gear ratio thereof, the potential of the base model vehicle, the road surface friction coefficient on which the vehicle is running, and the entry vehicle speed to the course. The positional correction of intersecting point P of the first assistance function evaluation map may be carried out according to another element or condition which gives an influence on the assistance function.

In each of the first, second, and third embodiments, the assistance function evaluation apparatus for the vehicle dynamics control system used in a development process in which the existing VDC system is mounted in a development schedule vehicle (a vehicle to be developed). However, the present invention is applicable to the assistance function evaluation system used in the development process in which a newly developed vehicle dynamics control system is mounted in the development schedule vehicle and the present invention is applicable to the assistance function evaluation apparatus used in the development process in which the newly developed vehicle dynamics control system is mounted in the existing vehicle. In addition, in each of the first, second, and third preferred embodiments, the real time simulator is used to execute the simulation. The present invention is applicable to another simulator than the real time simulator.

The entire contents of a Japanese Patent Application No. 2004-158214 (filed in Japan on May 27, 2004) are herein incorporated by reference. The scope of the invention is defined with reference to the following claims.

What is claimed is:

1. A driver model apparatus used to reproduce a travel along a set target course through a simulation, comprising:
    a calculating section that detects a positional deviation quantity as a deviation between a vehicular lateral displacement which would be developed in a case where the vehicle is advanced to a forward gaze point with a present vehicle posture maintained, the forward gaze point being a location point separated from the vehicle by a predetermined forward gaze distance and a location on the set target course which would develop in a case where the vehicle is advanced on the target course, detects a yaw angle deviation quantity as a deviation of a yaw angle displacement and a target yaw angle and calculates a steering angle imposed on a vehicle model through a feedback control using the positional deviation quantity, a positional deviation gain, the yaw angle deviation quantity and a yaw angle deviation gain.

2. A driver model apparatus as claimed in claim 1, wherein the predetermined forward gaze distance is set according to a distance at which the vehicle would be present after a set time in a case where a present vehicle speed is maintained.

3. An assistance function evaluation apparatus for a vehicle dynamics control system, the vehicle dynamics control system being an object to be evaluated and the assistance function evaluation apparatus comprising:
    models modeled for vehicle elements other than the vehicle dynamics control system, the models comprising:
        a vehicle model that is architected with parameterized characteristics of parts of a vehicle;
        a road surface environment model that prescribes a target course; and
        a driver model that calculates a steering angle imposed on the vehicle model to trace the target course; and
    a simulator configured to obtain a data base when the vehicle dynamics control system is operated, the simulator comprising:
        a driver intention quantity detecting section that detects an intention quantity of a vehicle driver to move the vehicle in a lateral direction; and
        a system function detecting section that detects a function quantity of the vehicle dynamics control system, and
    wherein the simulator is configured for evaluating that an assistance function of the vehicle dynamics control system is in conformity to the driver when the system function quantity and the driver intention quantity are balanced without excess or deficiency.

4. An assistance function evaluation apparatus for a vehicle dynamics control system as claimed in claim 3, wherein the driver intention quantity detecting section of the simulator obtains a grip limit vehicle speed and a passage limit vehicle speed by an execution of a simulation in which the target course is traced using the driver model and calculates a steering increment quantity according to a difference between a second steering quantity at the time of the passage limit vehicle speed and a first steering quantity at the time of the grip limit vehicle speed.

5. An assistance function evaluation apparatus for a vehicle dynamics control system as claimed in claim 3, wherein the system function detecting section obtains a grip limit vehicle speed and a passage limit vehicle speed by an execution of a simulation in which the target course is traced using the driver model and calculates an assistance rate according to a division of the passage limit vehicle speed by the grip limit vehicle speed.

6. An assistance function evaluation apparatus for a vehicle dynamics control system as claimed in claim 5, wherein the system function detecting section:
    executes the simulation in which the prescribed target course is traced with a vehicle speed raised by a unit of a set vehicle speed width using the driver model, the vehicle model, and the road surface environment model,
    defines the vehicle speed immediately before a front road wheel slip angle is in excess of a predetermined grip limit determination threshold value as the grip limit vehicle speed, and
    defines the vehicle speed immediately before the vehicle goes out of the target course as the passage limit vehicle speed.

7. An assistance function evaluation apparatus for a vehicle dynamics control system as claimed in claim 3, wherein the simulator includes a first assistance function evaluation map setting section in which a first assistance function evaluation map with a first axis as the driver intention quantity, with a second axis as the system function quantity, and with the first axis and the second axis mutually intersected is set,
    when, on the first assistance function evaluation map, an evaluation point determined according to the detected driver intention quantity and system function quantity falls in a first region in which both of the driver intention quantity and the system function quantity are larger than those of a third region in which the driver intention quantity and the system function quantity are smaller than those of the first region or falls in the third region, the simulator evaluates that the assistance function of the vehicle dynamics control system is in conformity to the driver, and
    when the evaluation point falls in either a second region or a fourth region in which one of the driver intention quantity and the system function quantity is larger than that of the third region and the other thereof is smaller than that of the first region, the simulator evaluates that the assistance function of the vehicle dynamics control system has excess or deficiency and is not in conformity to the driver.

8. An assistance function evaluation apparatus for a vehicle dynamics control system as claimed in claim 7, wherein an intersecting point between the first axis and the second axis on the first assistance function evaluation map is a point indicating the driver intention quantity on the first axis at a grip limit of a front wheel tire and a point indicating the system function quantity on the second axis at which the vehicle dynamics control system exhibits the assistance function without excess or deficiency.

9. An assistance function evaluation apparatus for a vehicle dynamics control system as claimed in claim 8, wherein the intersecting point between the first axis and the second axis on the first assistance function evaluation map is set to a position moved in a direction in which, as a wheel base or tread of the vehicle becomes larger, the driver intention quantity on the first axis becomes smaller.

10. An assistance function evaluation apparatus for a vehicle dynamics control system as claimed in claim 8, wherein the intersecting point between the first axis and the second axis on the first assistance function evaluation map is set to a position moved in a direction in which, as a steering gear ratio of the vehicle becomes quicker, the driver intention quantity on the first axis becomes smaller.

11. An assistance function evaluation apparatus for a vehicle dynamics control system as claimed in claim 8, wherein the intersecting point between the first axis and the second axis on the first assistance function evaluation map is set to a position moved in a direction in which, as a potential of a base model vehicle becomes higher, the system function quantity on the second axis becomes smaller.

12. An assistance function evaluation apparatus for a vehicle dynamics control system as claimed in claim 8, wherein the intersecting point between the first axis and the second axis on the first assistance function evaluation map is set to a position moved in a direction in which, as a coefficient of friction of a running road surface becomes lower, the system function quantity on the second axis becomes smaller.

13. An assistance function evaluation apparatus for a vehicle dynamics control system as claimed in claim 8, wherein the intersecting point between the first axis and the second axis on the first assistance function evaluation map is set to a position moved in a direction in which, as an entry vehicle speed to the target course becomes higher, the system function quantity on the second axis becomes smaller.

14. An assistance function evaluation apparatus for a vehicle dynamics control system as claimed in claim 3, wherein the simulator includes a second assistance function evaluation map setting section in which a second assistance function evaluation map with a first axis as the driver intention quantity and a second axis as the system function quantity is set, on the second assistance function evaluation map, a belt-like region in which the driver intention quantity and the system function quantity are proportionally varied is set to be a conformity zone, and when an evaluation point determined according to the detected driver intention quantity and the system function quantity is present in the conformity zone, the simulator evaluates that the assistance function of the vehicle dynamics control system is in conformity to the driver, and, when the evaluation point is out of the conformity zone, the simulator evaluates that the assistance function of the vehicle dynamics control system has excess or deficiency and is not in conformity to the driver.

15. An assistance function evaluation apparatus for a vehicle dynamics control system as claimed in claim 3, wherein the simulator includes a third assistance function evaluation map setting section in which a third assistance function evaluation map with a first axis as the driver intention quantity and a second axis as the system function quantity is set, on the third assistance function evaluation map, a belt-like region in which an allowable width with respect to a reference characteristic which is already conformed to be a conformity evaluation is set to be a conformity zone, when an evaluation point determined according to the detected driver intention quantity and the system function quantity is present in the conformity zone, the simulator evaluates that the assistance function of the vehicle dynamics control system is in conformity to the driver, and, when the evaluation point is out of the conformity zone, the simulator evaluates that the assistance function of the vehicle dynamics control system has excess or deficiency and is not in conformity to the driver.

16. An assistance function evaluation method for a vehicle dynamics control system, the vehicle dynamics control system being an object to be evaluated and the assistance function evaluation method comprising:

providing models modeled for vehicle elements other than the vehicle dynamics control system, the models comprising:

a vehicle model that is architected with parameterized characteristics of parts of a vehicle;

a road surface environment model that prescribes a target course; and a driver model that calculates a steering angle imposed on the vehicle model to trace the target course; and a simulator configured to obtain a data base when the vehicle dynamics control system is operated, the simulator is configured to perform the steps of:

detecting an intention quantity of a vehicle driver to move the vehicle in a lateral direction, detecting a function quantity of the vehicle dynamics control system, and evaluating that an assistance function of the vehicle dynamics control system is in conformity to the driver when the system function quantity and the driver intention quantity are balanced without excess or deficiency.

\* \* \* \* \*